United States Patent [19]

Pfalzer et al.

[11] 4,317,701
[45] Mar. 2, 1982

[54] APPARATUS FOR TREATING WASTE-PAPER

[75] Inventors: Lothar Pfalzer; Holzwirt Siegbert/Fischer, both of Heidenheim, Fed. Rep. of Germany

[73] Assignee: J. M. Voith GmbH, Fed. Rep. of Germany

[21] Appl. No.: 158,319

[22] Filed: Jun. 10, 1980

Related U.S. Application Data

[62] Division of Ser. No. 961,232, Nov. 16, 1978, abandoned.

[30] Foreign Application Priority Data

Nov. 16, 1977 [DE] Fed. Rep. of Germany ....... 2751084

[51] Int. Cl.$^3$ .................. D21C 7/00; D21C 7/06; D21C 7/08
[52] U.S. Cl. ................... 162/234; 162/237; 162/246; 162/261; 209/223 A; 241/43; 241/152 R
[58] Field of Search ............................ 162/4–8, 162/55, 233–237, 246, 261; 241/15, 21, 20, 42, 43, 152 R; 209/223 A; 422/268

[56] References Cited

U.S. PATENT DOCUMENTS

| | | | |
|---|---|---|---|
| 1,380,871 | 6/1921 | Swart et al. | 209/223 A |
| 3,420,638 | 1/1969 | Cutter et al. | 422/268 |
| 3,994,770 | 11/1976 | Lausch | 162/5 |

FOREIGN PATENT DOCUMENTS 135991 6/1952 Sweden .................. 162/237

*Primary Examiner*—Peter F. Kratz
*Attorney, Agent, or Firm*—Ostrolenk, Faber, Gerb & Soffen

[57] ABSTRACT

Waste paper is chemically and mechanically treated to pulp it into a stock. The waste paper is tumbled, without mechanical beating and without rotary means likely to become fouled by foreign material mixed with the paper. A chemical pulping liquid is mixed with the paper as it is being tumbled. The resulting tumbled, pulped waste paper is delivered to a reaction tower where it is further chemically pulped. The waste paper is removed from the bottom of the reaction tower. Various embodiments of paper tumbling devices are disclosed including a rotating drum, stepped conveyor belts, stepped rollers, a vibratory conveyor and a tumbling tower with baffle plates along its length. The reaction tower has an adjustable sized outlet opening at its bottom. An appropriate conveyor is insertable through the outlet opening of the reaction tower for extracting pulped paper stock.

7 Claims, 10 Drawing Figures

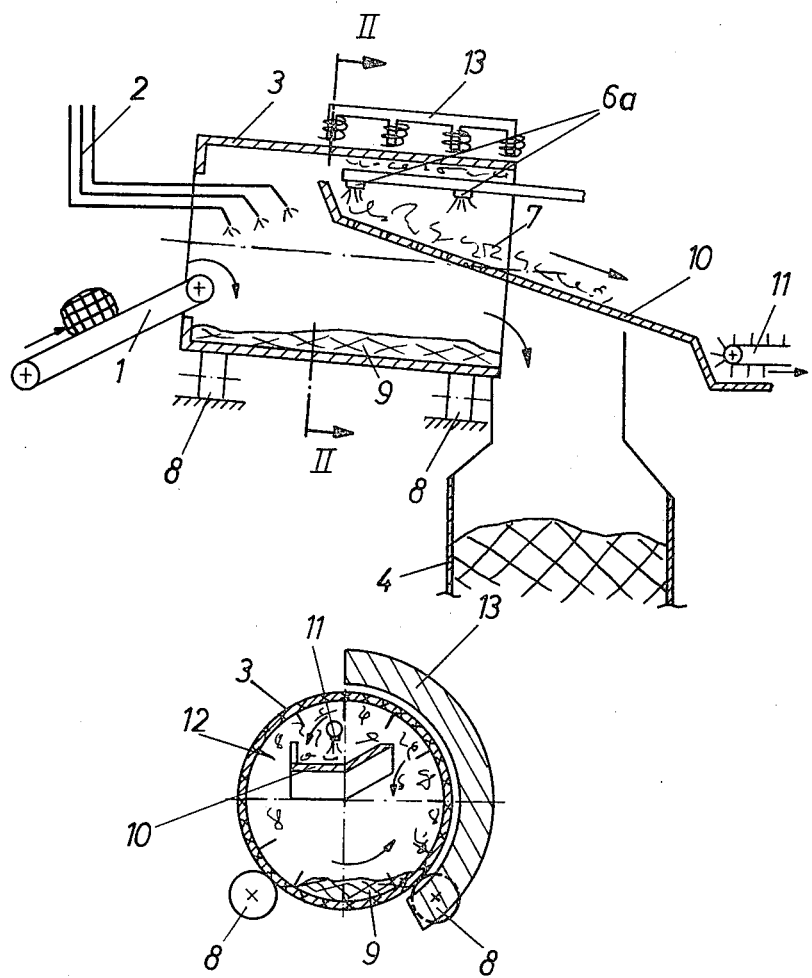

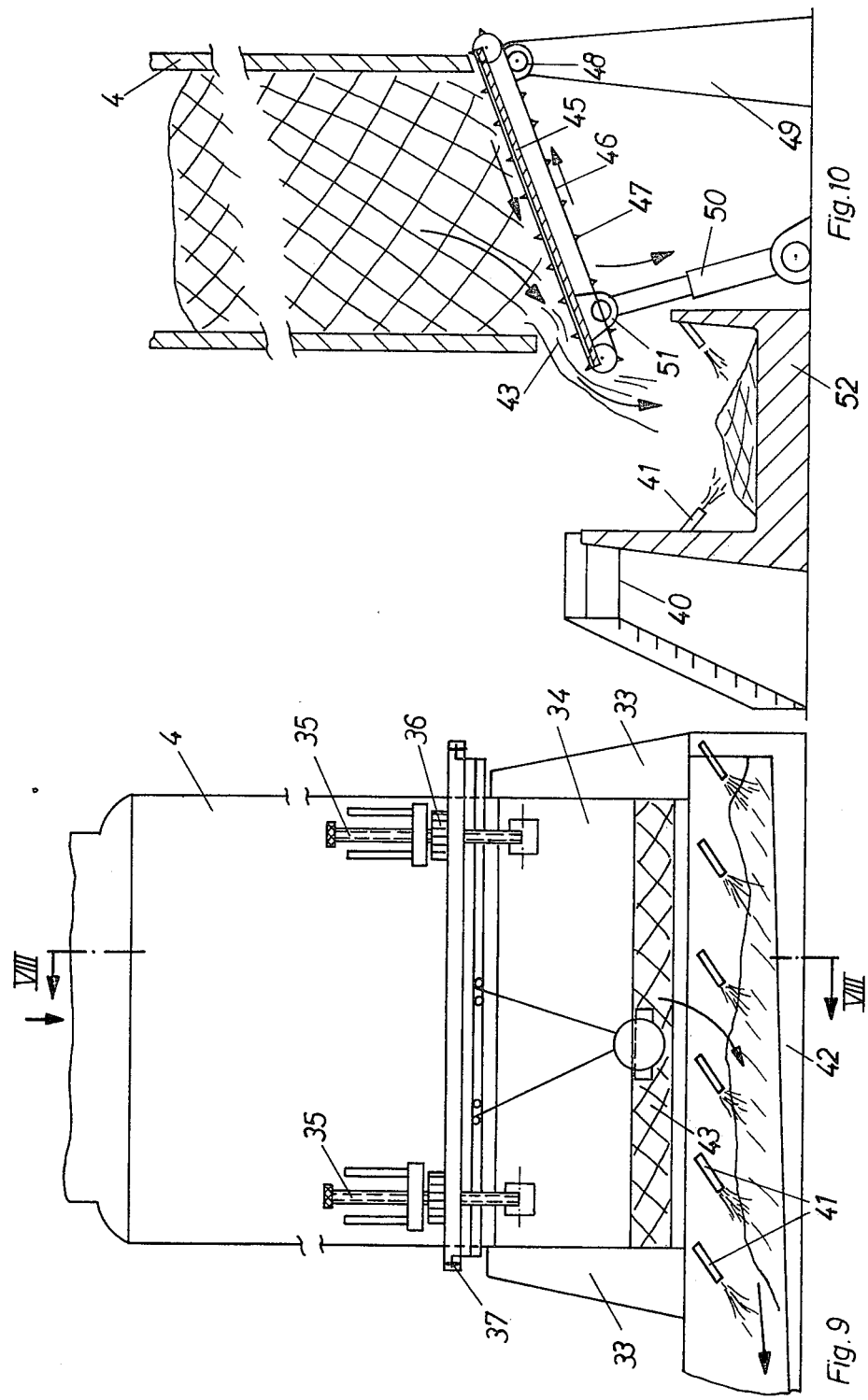

APPARATUS FOR TREATING WASTE-PAPER

RELATED APPLICATIONS

This is a divisional of U.S. patent application Ser. No. 961,232, filed Nov. 16, 1978 now abandoned.

The invention relates to processes and apparatus for treating waste-paper with a preimpregnation step in a stock density range of more than 10%, with chemical pulping by the addition of chemicals in a reaction tower at more than 10% stock density, with subsequent purification, picking, floatation or washing.

BACKGROUND OF THE INVENTION

A process of the above noted type is described in German Pat. No. 2 339 591. Instead of the form of treatment of waste-paper which has normally been used in a pulper, which has known disadvantages, in the process described in this specification, the waste-paper is pulped substantially by a purely chemical process. The bales of paper are broken up in a shredder and are then introduced via a feed screw into a reaction tower in which the pulping process is carried out with stock densities of more than 10%, and in the presence of chemicals. Separation of foreign matter present in the waste-paper is carried out after the paper has been pulped in the reaction tower, by means of cyclone separators, vibration sorters, and the like.

However, foreign matter which may become entangled, such as wires or twine, for example, present problems. These may wind themselves round the rotating parts such as the shredders, the thread on the screw conveyor, or the propeller rotor or agitator in the reaction tower, for instance. This interrupts the treatment process and sometimes also damages the rotating parts.

SUMMARY OF THE INVENTION

One object of the invention is to pulp the waste-paper in a technique which mechanically acts on the paper to pulp it.

It is a further object of the invention to mechanically pulp the paper without the mechanical means being in danger of suffering damage from foreign matter in the waste-paper.

Another object of the present invention is to pulp and treat waste-paper in which the foreign matter, and particularly that which is likely to become entangled, does not disturb the treatment process.

It is yet another object of the invention to mechanically pulp the waste-paper by impact.

A still further object of the invention is to pulp the waste-paper also with chemicals.

According to one aspect of the present invention, a process for treating waste-paper of the kind discussed above comprises breaking up bales of waste-paper by repeated tumbling motion but without mechanical beating means, impregnating the stock with chemicals while tumbling it and then delivering the stock, which is then in a thick stock state, to a reaction tower for chemical pulping. Because the waste-paper bales are broken up without mechanical beating means, rotating parts around which foreign matter could wind itself and become entangled may be dispensed with.

In a further development of the invention, provision is made for the paper that is being treated in the reaction tower in the thick stock state to be discharged from the reaction tower with a stock density of more than 10%. Unlike the reaction tower described in the prior art, there is no agitation by a propeller rotor in the lower section of the reaction tower. Hence, with the process according to the invention, there could not by any problem in the reaction tower arising from entangled foreign matter.

According to another aspect of the invention, apparatus for carrying out the above described process comprise means for imparting repeated tumbling motion to the bales of the paper. In one form, such means comprise a drum for breaking up the bales of waste-paper. The drum is mounted for rotation about its axis, e.g. on supporting rollers. The drum has an entrance opening in one end face for the introduction of the bales of paper which are to be treated and which has a discharge opening in the other end face for the discharge of the impregnated pulped paper. The bales of paper introduced into the drum are broken up by the rotation of the drum in conjunction with the addition of chemicals. It is advantageous if the drum is equipped on its inner surface with lifting elements for carrying out repeated lifting and dropping movements so as to break up the paper.

A particularly advantageous feature of the invention comprises providing a magnet outside the drum, spaced a short distance from the periphery of the drum, and extending around a section of the surface of the casing of the drum. When the drum rotates so that metal objects held to the interior surface of the drum by the magnet move out of the influence of the magnet, they fall free. A collecting trough for receiving any metal objects that are separated out of the pulped paper is arranged in the drum. In this way, ferrous metal objects such as wire, for example, can be removed in a simple manner.

In another embodiment of the invention, a vibratory gravity conveyor is provided for breaking up the bales of waste-paper.

In yet another embodiment, a plurality of conveyor belts are arranged stepwise, one after and below the other. It is advantageous, in this instance, for the conveyor belts of the conveyor to be equipped with a magnetic separating device.

A further embodiment of the invention comprises providing a plurality of rotatable rollers arranged in a stepped series, one below the other. The bales of waste-paper are delivered to the top roller by a conveyor appliance, or the like, and the paper passes down the plurality of rollers.

In yet another embodiment of the invention, an impregnation tower is provided with baffle plates for breaking up the bales of waste-paper. The bales of paper are introduced into the tower from above by means of a conveyor belt, or the like. In this instance, more effective breaking-up of the bales of paper can be achieved if the baffle plates are provided with an eccentric drive, which produces a vibratory motion.

The tumbling means deliver pulped paper to a reaction tower in which it is further chemically pulped. Provision may also be made for the reaction tower to have an adjustable discharge opening in its lower section, with a discharging device, e.g. a conveyor screw, lifting cylinder, or high-pressure spray device. Since the pulped paper is maintained in the stock density range of more than 10% in the reaction tower and no dilution is carried out, the discharging device enables the pulped stock to be removed from the reaction tower.

A further possibility for discharging the pulp comprises providing the reaction tower with an adjustable slope, inclined baseplate together with a conveyor belt or scraper conveyor. The amount of pulped wastepaper that is discharged is controlled by adjusting the inclination of the baseplate.

Other objects and features of the invention will be apparent from the following description taken with reference to the accompanying drawings.

BRIEF DESCRIPTION OF THE DRAWINGS

FIG. 2 is an enlarged longitudinal cross-sectional view through the breaking-up drum;

FIG. 3 is a cross-sectional view along the line II—II in FIG. 2;

FIG. 9 is a front view of the reaction tower shown in FIG. 8, shown partially in section, along the line IX—IX in FIG. 8; and FIG. 10 is a side cross-sectional view through the lower half of a reaction tower, with a discharging device.

DESCRIPTION OF THE PREFERRED EMBODIMENTS

In the process according to the invention, wastepaper is tumbled and mixed directly with chemicals, and is supplied to the reaction tower without any preliminary picking. The devices described hereinbelow are used for this purpose. In comparison with the thickstock towers previously used, the reaction tower used for the invention is constructed in such a way that no heavy dirt of any kind will cause problems.

Figure 1:
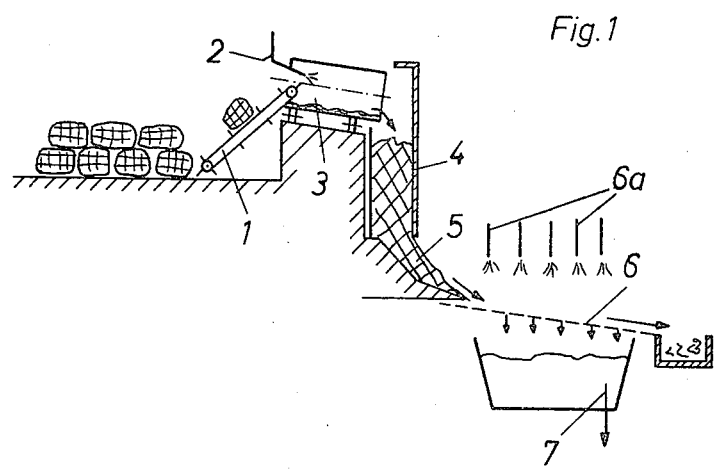
FIG. 1 schematically illustrates a basic paper pulping plant having a drum for breaking up the waste-paper bales.

According to the example shown in FIG. 1, wastepaper is transmitted via a conveyor belt 1 into a rotatable breaking-up drum 3. Means described below rotate the drum about its axis. The chemicals required for the pulping process are also introduced into the drum via chemical inlets 2 that deliver chemicals from a source (not shown). After the paper and chemicals have been mixed in the drum 3, the resulting stock falls through a reaction tower 4, and from there, it passes over a sloping screen 6 via special discharging devices 5, which will be described in more detail below. On the sloping screen 6, the pulp is rid of coarse and heavy foreign matter and all flat impurities that remain on the screen. After this, the pulp is collected in an intermediate vat 7 and is subjected to the conventional treatment process. To improve the removal of impurities, spray pipes 6a are arranged above the sloping screen 6 for spraying water or conventional treatment chemicals that help the stock flow through the screen.

The breaking-up drum 3 is shown more clearly in FIGS. 2 and 3. The breaking-up drum 3 is mounted on four supporting rollers 8, by means of which the drum is also driven. Inside the breaking-up drum 3, there are entrainment strips 12, e.g. generally axially extending flanges and plates, that are arranged in such a way that the stock 9 is repeatedly lifted up to be tumbled and dropped back again along a substantially parabolic trajectory to the base of the drum.

A semi-circular magnet 13 is arranged around the outside of the breaking-up drum 3. The magnetic attraction holds any pieces of ferrous metal still in the stock against the inner wall of the drum 3 until the drum 3 rotates far enough that metallic pieces inside the drum leave the field of influence of the magnet 13. Then the metal pieces fall into a collecting trough 10 which has a floor that slopes down toward the discharge side. The separated-out metal pieces are removed by means of a scraper-type clearing device 11. To recover any fibrous material that has also fallen into the collecting trough 10, the latter may be equipped with a perforated floor and with spraying nozzles, like the screen 6 and pipes 6a.

The breaking-up drum slopes gently down toward the discharge side so that the impregnated stock can fall into the reaction tower 4 in which it remains at a stock density of approximately 10 to 20%.

Instead of providing an isolated fixed magnet 13, in an embodiment not illustrated, the drum 3 itself may also be divided up into several sections that include electromagnetic elements, which are activated by means of sliding contact rings, for example.

Figure 4:
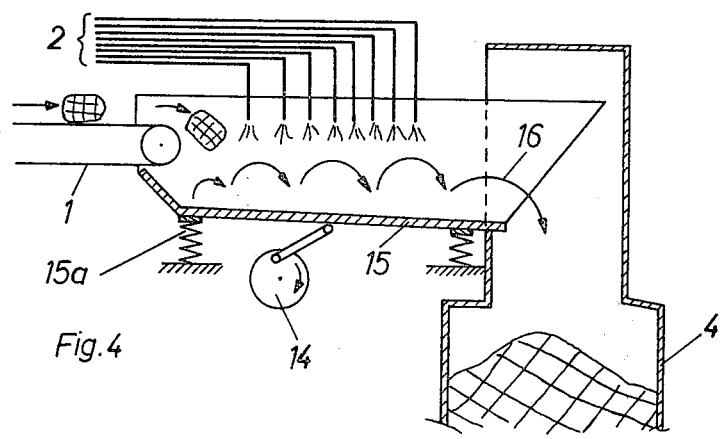
FIG. 4 schematically illustrates another embodiment of a breaking-up appliance having a vibratory gravity conveyor for use in a pulping plant.

In the second embodiment shown in FIG. 4, a breaking-up appliance with a vibratory gravity conveyor or vibratory trough 15 is used in place of the drum 3. The vibratory movement is achieved by means of an eccentric, crank type drive mechanism 14 operating in cooperation with the supporting springs 15a beneath the trough 15. With this appliance, the paper stock performs repeated tumbling motions in the form of bouncing movements that correspond to the path 16. As it is tumbling, the stock is suitably sprayed via the chemical liquid inlets 2. The results achieved depend in part on the amplitude and the frequency of the vibrations of the trough.

Figure 5:
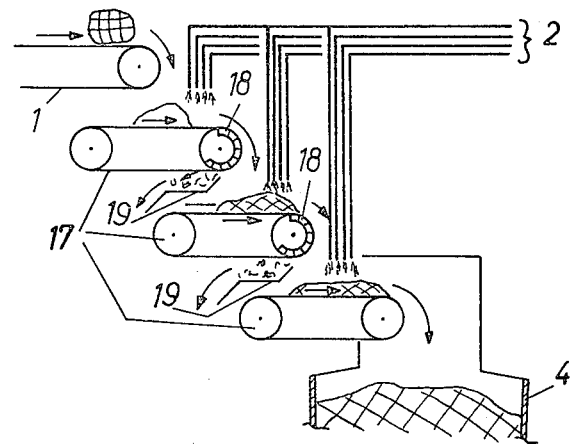
FIG. 5 schematically illustrates a third embodiment of a breaking-up appliance having conveyor belts arranged in steps for use in a pulping plant.

In the third embodiment shown in FIG. 5, the breaking-up appliance comprises a cascade of vertically separated conveyor belts 17. Each belt lower down projects forwardly of the outlet end of the belt above it, making a stepped arrangement, as illustrated. Chemical liquid inlets 2 above each belt deliver liquid onto the belt for impregnating the waste-paper there. The stock in this instance is thrown from each belt onto the belt lying next below, and the stock is thus repeatedly tumbled and broken up. In this instance, ferrous metal can also be removed at the same time by suitable magnets 18, placed immediately under some of the conveyor belts at the outlet ends thereof. Metal pieces are held by the magnets as the belts turn around the rollers until the magnetic attraction stops and the metal pieces can then fall into the appropriate conveyor chute 19. Here also, chemical liquid inlets 2 are used.

Figure 6:
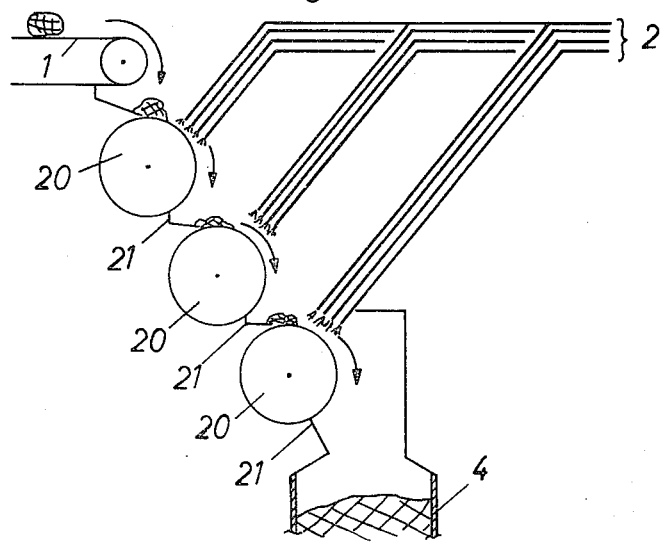
FIG. 6 schematically illustrates a fourth embodiment of a breaking-up appliance having a cascade of rollers for use in a pulping plant.

A similar type of breaking-up appliance is included in the fourth embodiment shown in FIG. 6. Instead of conveyor belts 17, a plurality of rollers 20 are arranged in an oblique array, one above the other for creating a cascading pathway. A respective wiper plate 21 beneath each roller 20 wipes off any stock that has adhered to the roller and that has not fallen free. This ensures that the stock is properly delivered further on. Removal of ferrous metal objects by means of magnets is also possible in this case. Note the similar use of chemical liquid inlets 2.

In the embodiments of FIGS. 5 and 6, the conveyor belts 17 and the rollers 20 may be referred to more generally as rotating elements.

Figure 7:
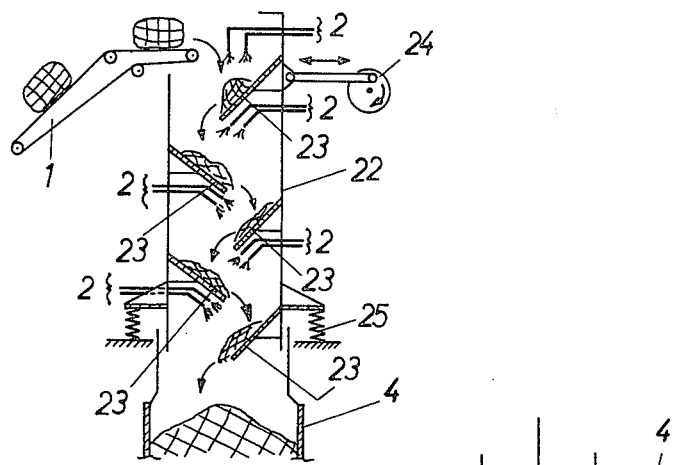
FIG. 7 schematically illustrates a fifth embodiment of a breaking-up appliance having an impregnation tower with baffle plates for use in a pulping plant.

A fifth embodiment of a breaking-up appliance including an impregnation tower 22 is shown in FIG. 7. The stock falls off the conveyor 1 into the top of the tower 2 and onto baffle plates 23 that project into the tower from the side walls thereof and that are arranged in a staggered array along the inside of the tower 22. At each baffle plate 23, the stock is sprayed by the chemical inlets 2, as in the other embodiments. The tower 22 is mounted on springs 25 and the tower is shaken by means of an eccentric cam 24 in such a way that the stock falls down continuously from one baffle plate to another, and is thus repeatedly tumbled and broken up.

Figure 8:
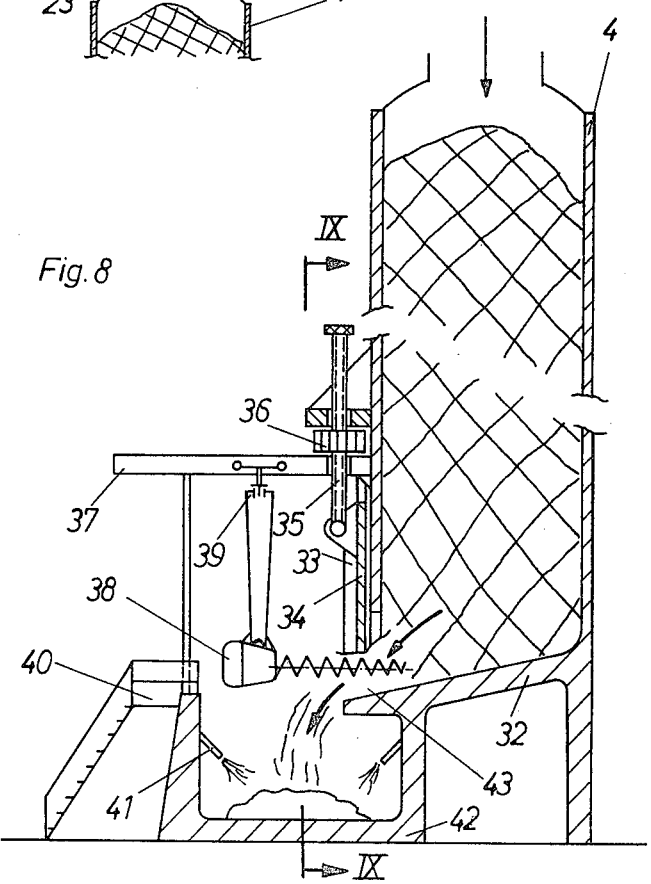
FIG. 8 is a longitudinal cross-sectional view on the line VIII—VIII of FIG. 9, through a reaction tower that receives pulped paper from the breaking-up appliance.

In every embodiment, after being broken up, the stock falls into a reaction tower 4 with a discharging device in its lower section. An embodiment of a reaction tower is shown in greater detail in FIGS. 8 and 9. The reaction tower includes a tall housing which has a sloping floor 32.

The reaction tower 4 may be square or round or of rectangular horizontal cross-section as illustrated, which may result in the saving of space. The special discharge equipment described below allows the choice of shapes for tower 4. At the side of the tower housing communicating with the lower side of floor 32, the housing wall has a large rectangularly shaped outlet opening 43 passing through it. The height of the outlet opening 43 can be set by vertical adjustment of a slide plate 34. The slide plate 34 runs in lateral guides 33 on the tower housing. The plate 34 is adjusted, for example, by means of threaded spindles 35. Knurled, internally threaded wheels 36 are operated manually or by a motor for rotating the spindles 35. Instead of the threaded spindles 35, it is also possible to use a pneumatically or hydraulically operated piston to adjust the height of the discharge opening 43.

The entire unit except for the reaction tower rests on a supporting framework 37. A movable screw conveyor 38 is also attached to the framework. The screw may be moved into the tower 4 through the opening 43 and may be moved laterally along the opening 43 (side to side in FIG. 9). The movement of the screw conveyor 38 is effected in a similar fashion to that of a gantry crane, with a travelling bogie 39. The screw conveyor 38 effects the discharge of a crumbly stock from the bottom of the tower 4 and into a trough 42 that has a floor with a gentle lateral slope, as shown in FIG. 9. The trough extends the full length of the opening 43 in front of the opening 43. The screw discharge conveyor 38 may be replaced by other similarly functioning devices, such as a high-pressure spray device, for example.

A plurality of spray pipes 41 are arrayed along the side walls of the trough 42 and they spray liquid from a source (not shown) into the trough and in a direction down the sloping floor and stock is conveyed further by means of a spray pipe 41. There is an observation platform 40 for monitoring the entire apparatus.

Another embodiment of a discharge device from a reaction tower 4 is shown in FIG. 10. The reaction tower has a sloping baseplate 45, like the baseplate 32. The inclination of the sloping baseplate 45 may be adjusted, because it is pivotally mounted at its rearward side on a fulcrum 48. The height of the baseplate 45 at the forward side can be adjusted, for instance, by means of a lifting cylinder 50 which is connected to the baseplate by a linkage 51. The baseplate 45 and its fulcrum 48 are supported on supports 49. The tower 4 itself may be arranged on supporting brackets (not shown), for example. The baseplate 45 supports a slow-running scraper belt 46, which passes around rollers at the forward and rearward sides. There are fillets 47 that project from the outer surface of the belt 46. These ensure the transportation of the thick pulp out of the reaction tower into a sloping trough 52, which is like the trough 42. As in the embodiment shown in FIGS. 8 and 9, spray pipes 41 are provided in the trough 52, and there is an observation platform 40.

Although the present invention has been described in connection with a plurality of embodiments thereof, many variations and modifications will now become apparent to those skilled in the art. It is preferred, therefore, that the present invention be limited not by the specific disclosure herein, but only by the appended claims.

What is claimed is:

1. Apparatus for treating waste paper in a stock density range of more than 10%, said apparatus comprising:
    tumbling means including a device for tumbling the waste paper for pulping it, said tumbling device comprising a plurality of rotating elements, each of said rotating elements arranged to receive waste paper on top thereof and each rotating element being structurally arranged to rotate to move the waste paper to fall free of that said rotating element, said rotating elements being arranged one above the other in stepped fashion and being so stepped that as waste paper falls free of one said rotating element, it falls to the top of said rotating element beneath;
    chemical liquid dispensing means for dispensing chemical liquid on to each said rotating element for impregnating the waste paper;
    means for delivering waste paper onto the top said rotating element of said plurality of rotating elements;
    a reaction tower located to receive tumbled waste paper that leaves said tumbling device, said reaction tower having an upper section at which tumbled waste paper is received and a lower section with an outlet opening from which pulped paper leaves said reaction tower; and
    a discharging device communicating through said outlet opening for discharging pulped paper from said reaction tower.

2. The apparatus for treating waste paper as claimed in claim 1, wherein each of said rotating elements is a conveyor belt.

3. The apparatus for treating waste paper of claim 2, further comprising a respective separating device for at least some of said conveyor belts for separating out ferrous metal objects from the waste paper that is passing over the respective said conveyor belts.

4. The apparatus for treating waste paper of claim 1, further including means for adjusting said outlet opening size.

5. The apparatus for treating waste paper of claim 1, wherein said discharging device comprises a screw conveyor.

6. The apparatus for treating waste paper of claim 1, wherein said discharging device comprises a sloping base plate in said reaction tower, having a conveyor belt defined thereon movable for conveying pulped paper out of said outlet opening; and further including means for adjusting the slope of said base plate.

7. The apparatus of claim 1, wherein said rotating elements each comprise a rotatable roller.

* * * * *